(12) United States Patent
Janarthanam

(10) Patent No.: US 9,643,552 B2
(45) Date of Patent: May 9, 2017

(54) ELECTRICAL POWER SYSTEM FOR HYBRID VEHICLES

(71) Applicant: FORD GLOBAL TECHNOLOGIES, LLC, Dearborn, MI (US)

(72) Inventor: Suriyaprakash A. Janarthanam, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 14/244,077

(22) Filed: Apr. 3, 2014

(65) Prior Publication Data
US 2015/0283964 A1    Oct. 8, 2015

(51) Int. Cl.
  *B60R 16/033*   (2006.01)
  *B60L 11/12*    (2006.01)
  *B60L 11/14*    (2006.01)
  *B60L 11/18*    (2006.01)

(52) U.S. Cl.
  CPC ......... *B60R 16/033* (2013.01); *B60L 11/12* (2013.01); *B60L 11/14* (2013.01); *B60L 11/1803* (2013.01); *B60L 11/1853* (2013.01); *B60L 11/1864* (2013.01); *B60L 11/1877* (2013.01); *B60L 11/1879* (2013.01); *B60L 2210/10* (2013.01); *B60L 2240/527* (2013.01); *Y02T 10/7005* (2013.01); *Y02T 10/7061* (2013.01); *Y02T 10/7077* (2013.01); *Y02T 10/7216* (2013.01)

(58) Field of Classification Search
  CPC .................................................... B60R 16/033
  USPC .......................................................... 307/9.1
  See application file for complete search history.

(56) References Cited

U.S. PATENT DOCUMENTS

| | | | |
|---|---|---|---|
| 6,430,692 B1 | 8/2002 | Kimble et al. | |
| 7,843,169 B1 | 11/2010 | Tsukamoto et al. | |
| 2008/0224539 A1* | 9/2008 | Rennie | B60R 16/03 307/35 |
| 2014/0183939 A1* | 7/2014 | Jiang | B60L 11/1853 307/9.1 |

* cited by examiner

*Primary Examiner* — Joseph Chang
(74) *Attorney, Agent, or Firm* — David B. Kelley; MacMillan, Sobanski & Todd, LLC

(57) ABSTRACT

A modular battery and power control system provides a range of electrical power to high voltage and low voltage power demand systems in a hybrid vehicle. The modular battery and power control system provides a dual voltage modular battery pack that provides both a high voltage output and a low voltage output. The modular battery pack is selectively connected to high voltage and low voltage demand systems by a switch system. The switch system is controlled by an ignition switch module which determines the electrical demands of the hybrid vehicle.

17 Claims, 4 Drawing Sheets

ELECTRICAL POWER SYSTEM FOR HYBRID VEHICLES

BACKGROUND OF INVENTION

This invention relates in general to internal combustion engine and electric powered hybrid vehicles. In particular, this invention relates to an improved electrical system for hybrid vehicles.

Hybrid electric vehicles, generally, are vehicles that use electricity, to at least some degree, to supply motive power or limit the use of conventional internal combustion (IC) power sources. Hybrid vehicles are often defined by their powertrain layout and the degree to which electric motors influence power consumption. Two broad categories of hybrid vehicle powertrains, having both IC engines and electric propulsion, are parallel hybrids and series hybrids. Parallel hybrids, generally, have a powertrain layout where an IC power source and an electric power source combine to provide power to the wheels. Alternatively, some parallel hybrids connect the IC source and the electric power source to a common point, such as a transmission, and transmit power to the wheels from that point. Series hybrids, generally, use electric motors to drive the wheels and an IC engine drives a generator to augment/charge the batteries or power the motors directly.

Hybrid electric vehicles may also be categorized by the degree of hybridization, that is the amount of propulsion available from an electrically powered source. Full hybrids, which may be series or parallel powertrain arrangements, typically can drive the wheels by the IC engine, batteries powering electric motors, or a combination of both. Mild hybrids, on the other hand, rely on the IC engine for the main source of motive power and utilize electric power to improve efficiency. Some mild hybrids improve IC engine efficiencies by limiting the conditions that call for engine power. For example, IC engines having starter/alternator systems will shut the engine off during idling conditions and run accessories through an accessory drive electric motor. The starter/alternator will restart the engine when the driving cycle is initiated or when a secondary electric motor driving capacity is exceeded. Other mild hybrids augment IC engine output by using a motor/generator on the non-driving wheels to capture braking energy to recharge batteries. These motors may also provide limited driving power prior to the IC engine demand.

Many hybrid architectures, particularly full hybrids and mild hybrids, rely on a low voltage battery source, for example a conventional 12 volt battery, to start the IC engine and a high voltage battery source, for example a 48 volt to a 300-plus volt source, to store energy and power wheel motors. Because vehicle weight directly impacts efficiency and cost, there is a need to improve hybrid vehicles to fully utilize available power sources. In addition, packaging space in hybrid vehicles is particularly limited due to the size of batteries. Thus, it would be advantages to provide an electrical system, particularly for a hybrid vehicle, that reduces the number of battery systems need to power a vehicle.

SUMMARY OF INVENTION

This invention relates to a modular battery and power control system for providing a plurality of voltage level outputs, which reduces the number of battery systems needed to power a vehicle. The system includes a modular battery pack and a switch system. The modular battery pack has a plurality of interconnected battery cells that provide a high voltage output to a high voltage connecting harness and a low voltage output to a low voltage connecting harness. The switch system includes a plurality of electrical contact points, a solenoid portion, and an ignition switch module. The plurality of electrical contact points electrically connect the high voltage connector of the modular battery back to at least one of the high voltage connector and the low voltage connector. The ignition switch module selectively controls the solenoid portion to electrically connect the modular battery pack to at least one of the high voltage connector and the low voltage connector.

Various aspects of this invention will become apparent to those skilled in the art from the following detailed description of the preferred embodiment, when read in light of the accompanying drawings.

DETAILED DESCRIPTION

Figure 1:
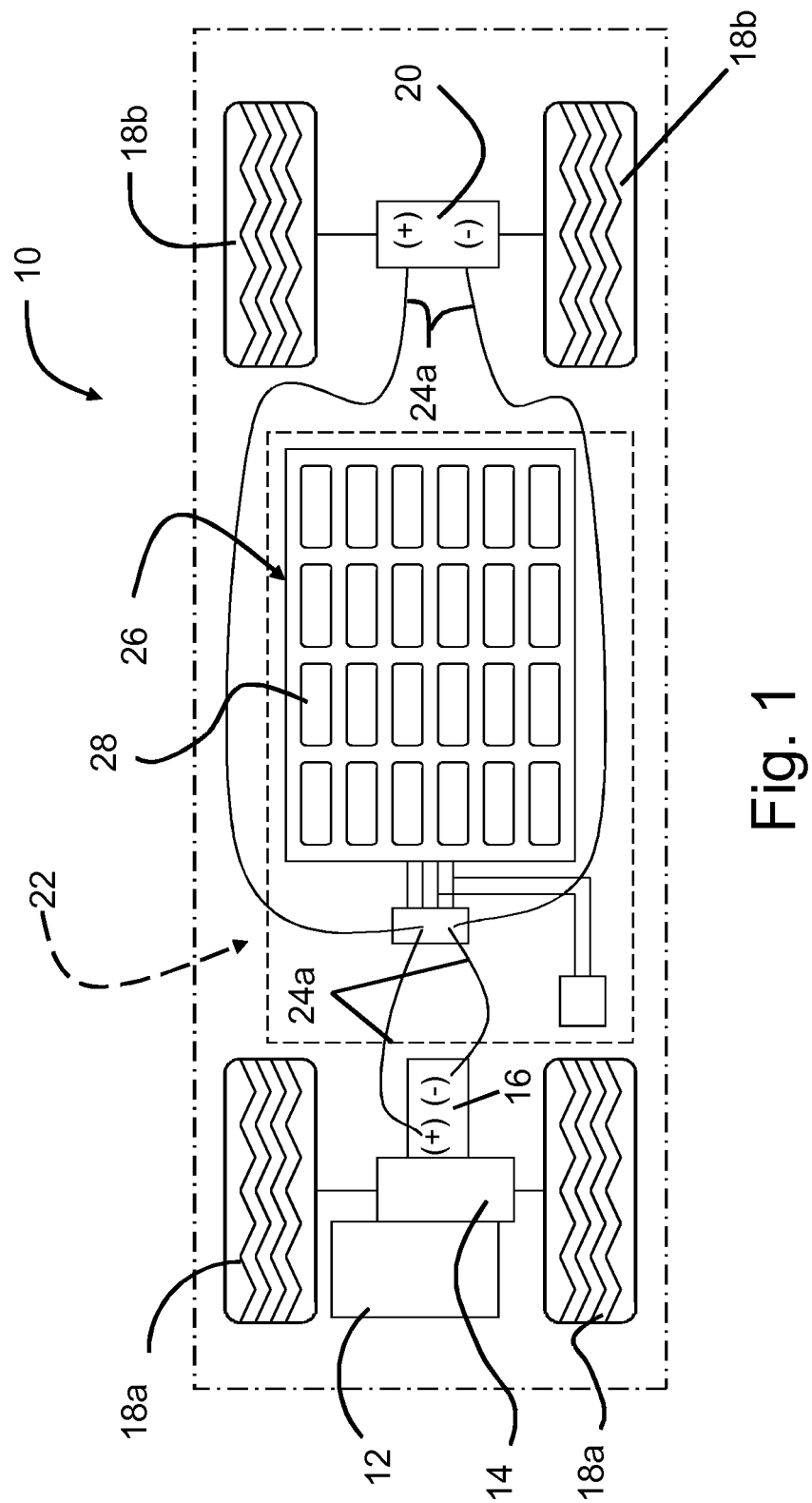
FIG. 1 is a schematic plan view of an embodiment of a mild hybrid vehicle powertrain layout.

Referring now to the drawings, there is illustrated in FIG. 1 a schematic view of a mild hybrid vehicle and powertrain layout, shown generally at 10. The mild hybrid vehicle 10 includes an IC engine 12, a transmission 14, and an electric assist motor (EAM) 16. The IC engine 12 drives the transmission 14 which, in turn, drives at least one wheel, shown as a front wheel 18a. In one embodiment of the mild hybrid vehicle, the EAM 16 may be configured as a starter/alternator which is configured to initially start the engine and restart the engine after efficiency shut down periods. Alternatively, EAM 16 may be configured to provide augmented power and regenerative braking, such as regenerative engine braking or regenerative pedal-actuated braking, through the transmission 14. In another aspect of the mild hybrid vehicle 10, an electric assist motor 20 may be connected to wheels, such as rear wheels 18b, which are not driven by the IC engine 12. The electric assist motor 20 may provide regenerative braking and a power assist mode that augments the IC engine power and/or provides motive power prior to restarting the IC engine 12.

Figure 2:
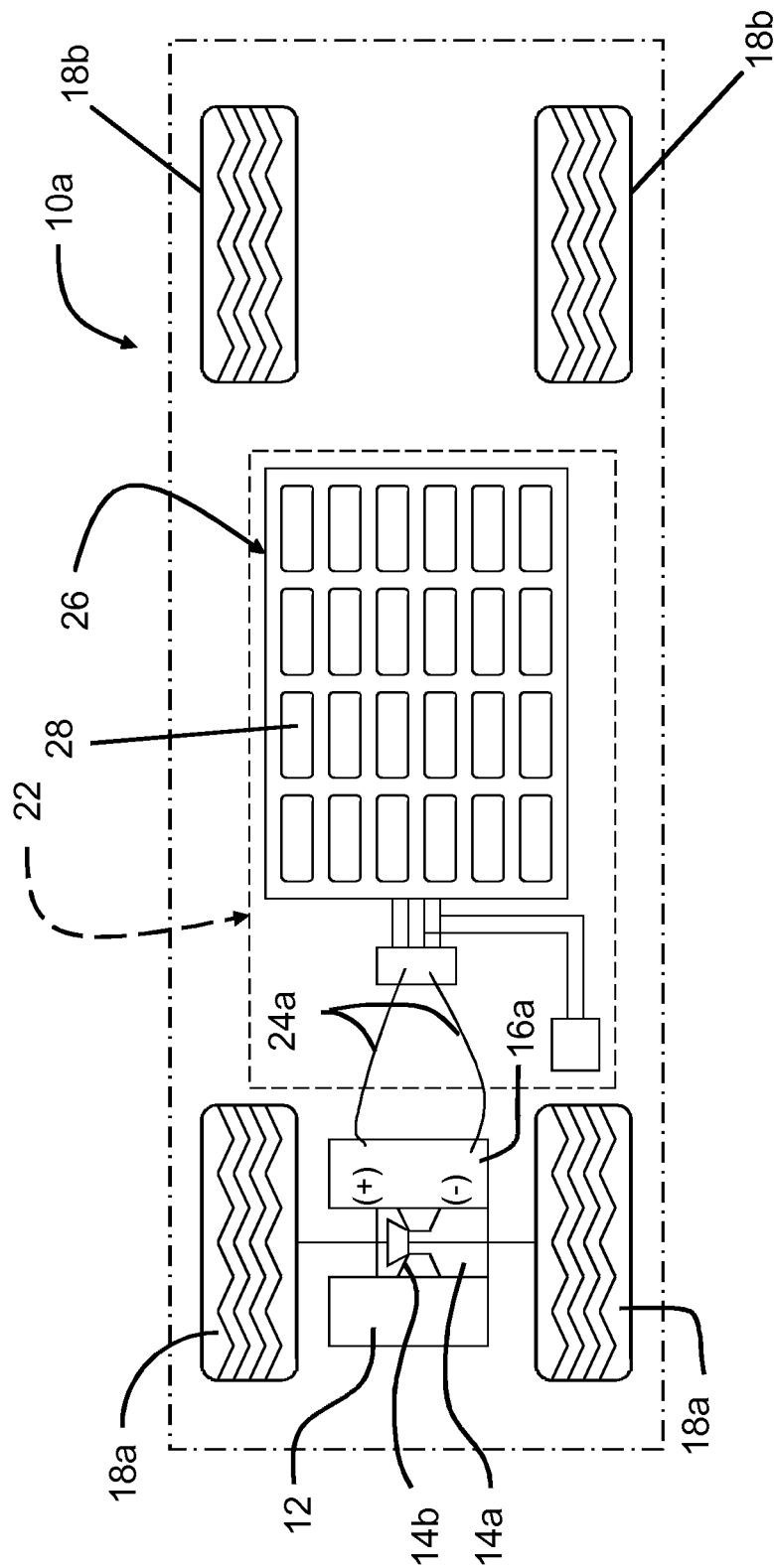
FIG. 2 is a schematic plan view of an embodiment of a full hybrid vehicle powertrain layout.

As shown in FIG. 2, a full hybrid vehicle is schematically illustrated, generally at 10a. The full hybrid system 10a may share several similar components of the mild hybrid system 10. Thus, the same reference numbers may be used to indicate the same or substantially the same components. The full hybrid vehicle 10a includes the IC engine 12 and an electric drive motor (EDM) 16a connected to a gear box 14a that may include a differential gear set 14b or clutching arrangement to permit power input from either the IC engine 12 or the EDM 16a to the front wheels 18a and/or rear wheels 18b. Though the illustrated full hybrid vehicle is shown as a parallel hybrid powertrain layout, a series powertrain layout may also be provided. In such an arrangement, the wheels 18a may be connected to the EDM 16a and the IC engine 12 connected to a generator 14b. Additionally, a singular or second EDM, similar in arrangement to the EAM 20 of FIG. 1, may be provided.

Figure 3:
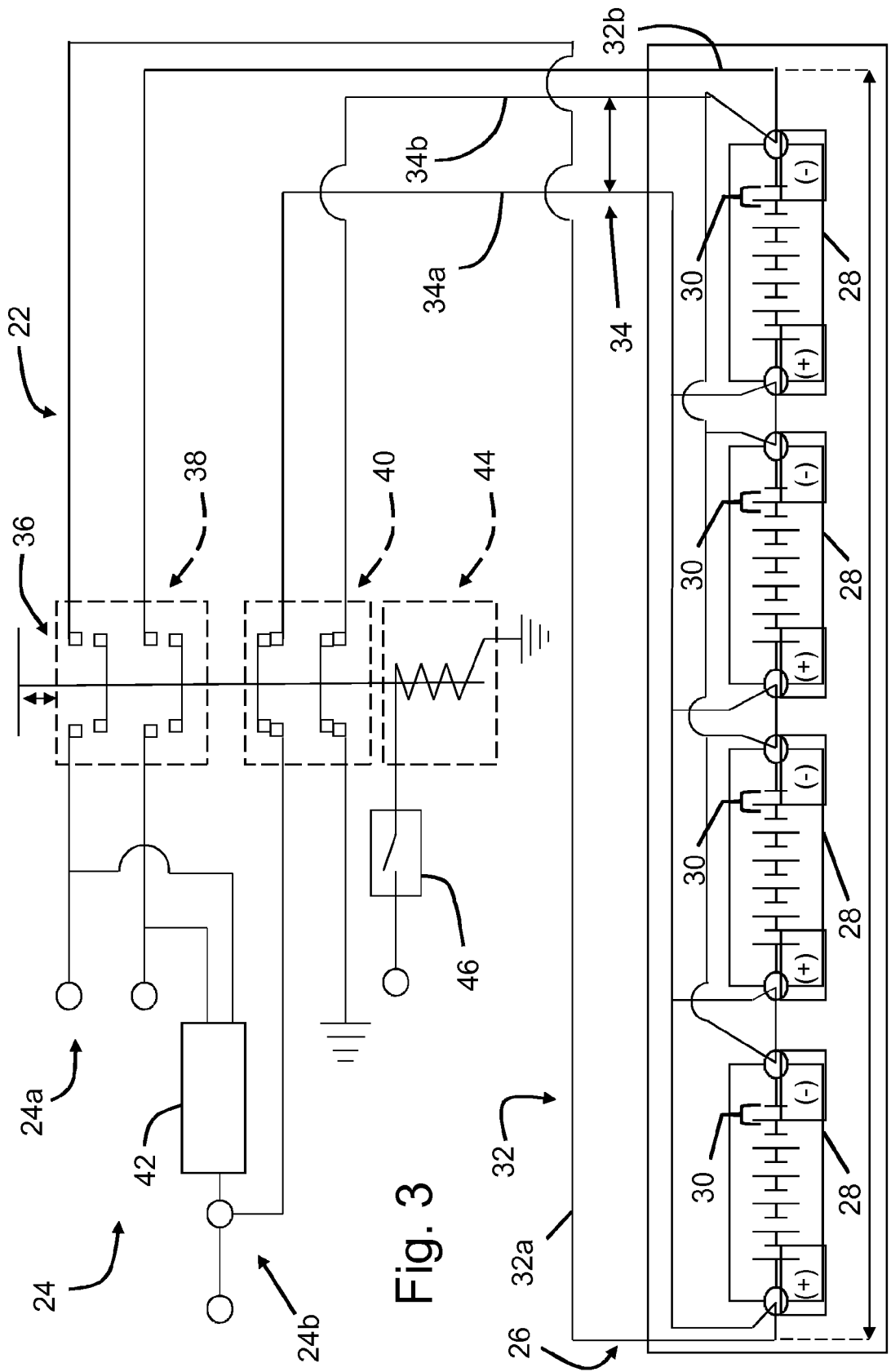
FIG. 3 is a schematic view of an embodiment of a portion of a hybrid vehicle electrical system having a dual voltage, modular battery configuration.

As shown in FIGS. 1 and 2, the hybrid vehicles 10 and 10a include a modular battery and power control (BPC) system, shown generally at 22, that connects to a hybrid vehicle electrical system, a portion of which is shown generally at 24 in FIG. 3, which may be a high and low voltage demand electrical system. The modular BPC system 22 is connected to a high voltage power demand, such as for example the EAM 16 or the EDM 16a, by way of a high voltage buss system 24a. The modular BPC system 22 also connects, by way of a low voltage buss system 24b (shown in FIG. 3), to supply a low voltage power demand of the hybrid vehicle.

Referring now to FIG. 3 (in view of FIGS. 1 and 2), there is illustrated a schematic view of an embodiment of the modular BPC system 22. The modular BPC system 22 includes a modular battery pack, indicated generally at 26. The modular battery pack 26 is formed from a plurality of interconnected battery modules 28. Each module 28 includes one or more cells 30 that generate a basic unit voltage. For example, when the modules are formed from lead-acid cells, the basic unit voltage of each cell is about two volts. The modules 28 may be formed from cells of any suitable composition, such as lithium-ion, nickel metal hydride, nickel cadmium, flow battery, and others. The cells 30 may be configured to produce any desired basic unit voltage. The cells 30 are illustrated as being connected in series to form an output voltage for each of the modules 28. The cells 30 may be connected in any suitable number to provide the desired voltage output for the modules 28.

The modules 28 are arranged, in any suitable number, and connected together, such as in parallel and series arrangements, to produce the desired voltage and current outputs for the modular battery pack 26. The modules 28 of the modular battery pack 26 are connected together by a high voltage connecting harness 32 and a low voltage connecting harness 34. The high voltage connecting harness 32 may have a positive electrical section 32a and a negative electrical section 32b configured to connect to at least the high voltage demand portion of the hybrid vehicle electrical system 24. The low voltage connecting harness 34 may also have a positive electrical section 34a and a negative electrical section 34b configured to connect to the low voltage demand portion of the hybrid vehicle electrical system.

For example, the high voltage connecting harness 32 may transmit a 48 volt power output and the low voltage connecting harness 34 may transmit a 12 volt power output. Or, the high voltage connecting harness 32 may transmit a 300 volt power output and the low voltage connecting harness 34 may transmit a 12 volt power output or a 24 volt power output. It should be understood that any desired high voltage output and low voltage output may be produced by the modular battery pack 26, with a difference in high to low voltage of at least 24 volts. For example, the low voltage may be 24 volts or less and the high voltage may be 48 volts or higher. In another embodiment, the high and low voltage outputs of the modular battery pack 26 are multiples of the basic unit voltage of the cells 30, within the voltage ranges discussed above.

In the illustrated embodiment, the modular battery pack 26 is connected, by way of the high voltage connecting harness 32 and the low voltage connecting harness 34, to an electrical switch system that includes a switching unit configured as a change-over switch, shown generally at 36. In one embodiment, the change-over switch 36 is configured as a double pole, double throw (DPDT) switch that selectively connects the modular battery pack 26 to the hybrid vehicle electrical system 24.

The change-over switch 36 includes a high/low voltage contact section, shown generally at 38, and a low voltage contact section, shown generally at 40. As used herein, the term "high/low" means both "high and low" voltage. The high/low voltage contact section 38 may be connected to drive hybrid powertrain functions, particularly operation of the EAM 16 or the EDM 16a, or operate any high voltage demand requirement (i.e. a voltage greater than the low voltage demand), along with operating the low voltage power demand. The low voltage contact section 40 provides electrical power to drive the low voltage power demand without connection to the high voltage circuit. The change-over switch 36 may also connect the modular battery pack 26 to a DC/DC converter 42, which may include, or alternatively be configured as, an alternator.

The modular BPC system 22 also may include a service disconnect (not shown). In one embodiment, the alternator 42 may be configured as a conventional automotive-type (e.g. Lundell or compact style) alternator connected to the hybrid vehicle electrical system 24. Alternatively, the alternator 42 may be any electric power generation device, such as a fuel cell, solar panel, generator, and the like.

The change-over switch 36 includes a solenoid portion, shown generally at 44, that activates one of the high/low voltage contact section 38 and the low voltage contact section 40 to selectively connect the modular battery pack 26 to the vehicle load demand. The solenoid portion 44 may be in communication with an ignition switch module 46 or other control module that can determine the electrical demand state of the vehicle. The ignition switch module 46 provides a user demand signal to the solenoid portion 44 to selectively engage either the high/low voltage contact section 38 or the low voltage contact section 40. One input is the "key" position, which may be configured as a traditional key/switch arrangement or a smart switch, for example such as the type having a transmitted key code signal, both of which would enable or disable actuation of the change-over switch 36. The ignition switch module 46 may include an algorithm that determines the user demand based on sequencing and/or position of the switch. For example, when the user inputs a key position; such as an "accessory" key position enabling only selected accessory devices such as for example radio, fan, and power window circuits; the ignition switch module 46 responds by activating the solenoid portion 44 of the change-over switch 36 to connect the low voltage contact section 40 and disconnect the high/low voltage contact section 38, as shown in FIG. 3. If the user engages a "run" key position, the change-over switch 36 connects the high/low voltage contact section 38 such that the high and low voltage connecting harnesses 32 and 34 communicate between the modular battery 26 and the respective high and low voltage circuits 24a and 24b. The high voltage circuit connection enables operation of the EAM 16 or EDM 16a.

Figure 4:
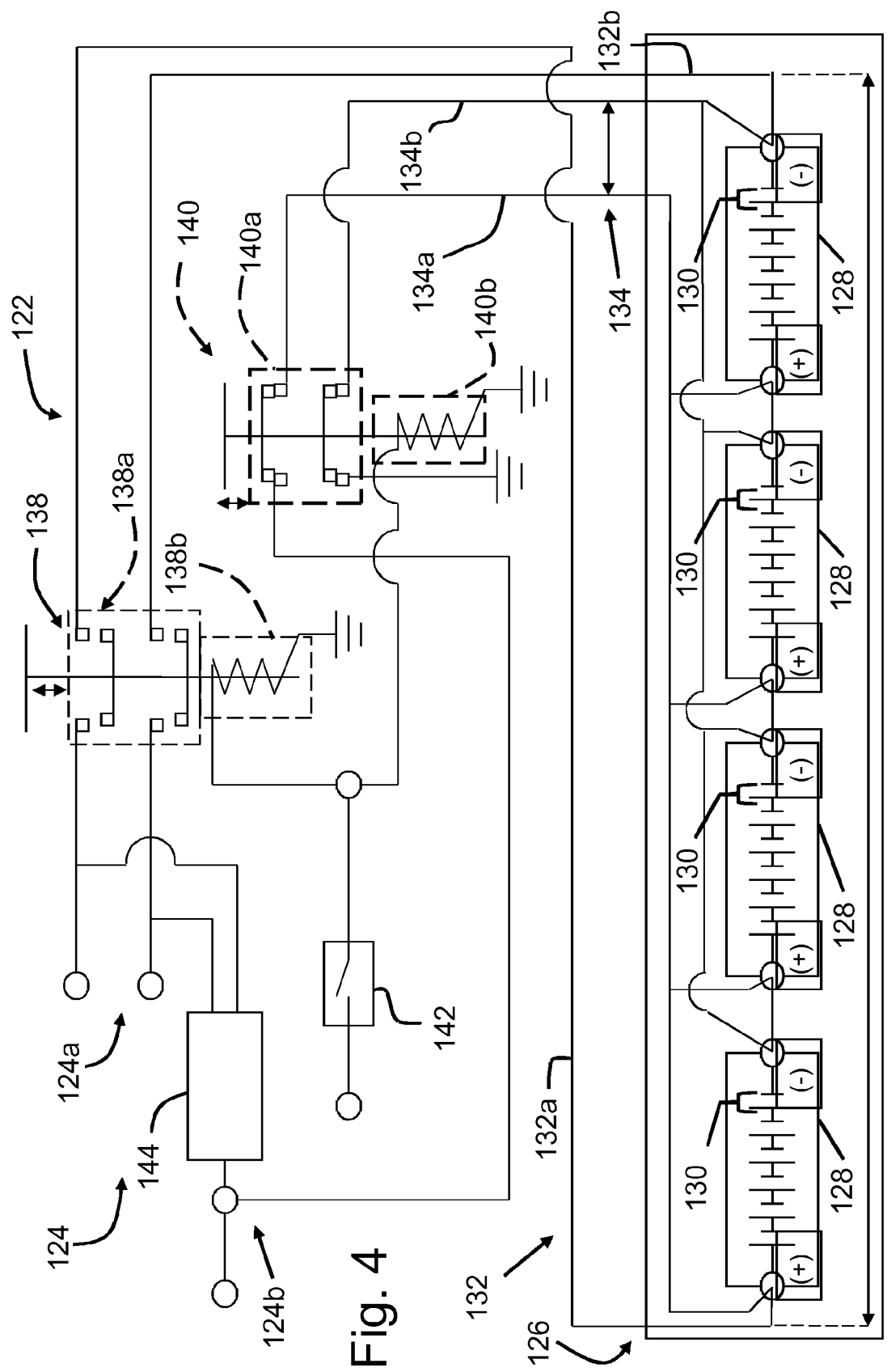
FIG. 4 is a schematic view of another embodiment of a portion of a hybrid vehicle electrical system, similar to FIG. 3, having an alternative switch configuration.

Referring now to FIG. 4, with reference to FIGS. 1 and 2, there is illustrated an alternative embodiment of a modular BPC system, shown generally at 122. The modular BPC 122 connects to a hybrid vehicle electrical system, a portion of which is shown generally at 124, which is a high and low voltage demand electrical system. The modular BPC system 122 is connected to a high voltage power demand, such as for example the EAM 16 or the EDM 16a, by way of a high voltage buss system 124a. The modular BPC system 122 also connects, by way of a low voltage buss system 124b, to supply a low voltage power demand of the hybrid vehicle.

The modular BPC system 122 includes a modular battery pack 126 having modules 128 formed from one or more cells 130 that generate a basic unit voltage. For example, when the modules 128 are formed from lead-acid cells, the basic unit voltage of each cell is about two volts. The modules 128 may be formed from cells of any suitable composition, such as lithium-ion, nickel metal hydride, nickel cadmium, flow battery, and others. The cells 130 may be configured to produce any desired basic unit voltage. The cells 130 are illustrated as being connected in series to form an output voltage for each of the modules 128. Alternatively, the cells 130 may be connected in parallel to provide a high current output at the basic unit voltage. The cells 130 may be connected in any suitable number and manner to provide any desired voltage output for the modules 128.

The modules 128 are then arranged, in any suitable number, and connected together, such as in parallel and series arrangements, to produce the desired voltage and current outputs for the modular battery pack 126, as discussed above relative to FIG. 3. Any number of the modules 128 may be connected together in either the parallel or the series connection arrangements to provide the desired voltage outputs.

The modules 128 of the modular battery pack 126 are connected together by a high voltage connecting harness 132 and a low voltage connecting harness 134 to supply the respective high and low voltage power demands of the hybrid vehicle. The high voltage connecting harness 132 may have a positive electrical section 132a and a negative electrical section 132b configured to connect to the high voltage demand portion of the hybrid vehicle electrical system 124. The low voltage connecting harness 134 may also have a positive electrical section 134a and a negative electrical section 134b configured to connect to the low voltage demand portion of the hybrid vehicle electrical system. The high voltage connecting harness 132 and the low voltage connecting harness 134 transmit any desired high voltage output and low voltage output that may be produced by the modular battery pack 126.

The modular BPC system 122 includes a high/low voltage connector switch, shown generally at 138, and a low voltage connector switch, shown generally at 140. The high/low and low voltage connector switches 138 and 140 are illustrated as double pole, single throw (DPST) switches. Alternatively, the connector switches 138 and 140 may be configured as multiple single pole, single throw (SPST) switches. The high/low voltage connector switch 138 includes a contact portion 138a and a solenoid portion 138b. Similarly, the low voltage connector switch 140 includes a contact portion 140a and a solenoid portion 140b. The high/low voltage contact portion 138a is in selective electrical communication with the high voltage buss system 124a and the low voltage buss system 124b to supply both the high voltage power demand and the low voltage power demand of the vehicle. The solenoid portions 138b and 140b of the HV/LV connector switch 138 and the LV connector switch 140, respectively, may be separate solenoid portions or a single integrated solenoid portion, if desired. The solenoid portion 138b of the high/low voltage connector switch 138 and the solenoid portion 140b of the low voltage connector switch 140 actuate the respective switch contact portions 138a and 140a in response to a system status input or system power demand input, such as the position of an ignition switch module 142.

The ignition switch module 142 may include an algorithm that determines the user demand based on sequencing and/or position of the switch or based on the voltage demand input from the user. The ignition switch module 142 actuates the HV/LV solenoid portion 138b in response to, for example, the ignition switch module 142 being actuated to a "run" position which enables operation of the EAM 16 or the EDM 16a. In an embodiment of the operation of the modular BPC system 122, when the ignition switch module is actuated to the "run" position, the HV/LV solenoid portion 138b causes the contact portion 138a to bring the high voltage connecting harness 132 into electrical communication with the high voltage buss system 124a, which supplies the high voltage power demand.

The high voltage buss system 124a, in turn, is also electrically connected to the low voltage buss system 124b through a DC/DC converter 144. The DC/DC converter 144 then steps down the high voltage power, supplied by the modular battery pack 126, to the low voltage level and transmits that low voltage power to the appropriate vehicle systems connected to the low voltage connector 124b. The LV connector switch 140 is not actuated and is electrically disconnected from the hybrid vehicle electrical system 124.

When the ignition switch module 142 is moved to an "accessory" position, which defines operation of certain low voltage power demand systems, the solenoid portion 140b of the LV connector switch 140 is energized. The solenoid portion 140b causes the contact portion 140a to bring the low voltage connecting harness 134 into electrical communication with the low voltage buss system 124b. As shown in FIG. 4, the connection of the low voltage connecting harness 134 to the low voltage buss system 124b bypasses the DC/DC converter 144 and directly supplies the low voltage power demand of the vehicle. In other embodiments, a DC/DC converter, similar to the DC/DC converter 144, may be used to step the low voltage power up or down to a slightly higher or lower voltage level, if desired.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle electrical control system comprising:
   a battery having modules connected in series, providing a high voltage output, and all connected in parallel, providing a low voltage output;
   a switch system comprising:
      electrical contacts selectively connecting the high voltage output to a high voltage bus and a low voltage bus;
      a switch selectively electrically connecting the battery to both the high voltage bus and the low voltage bus or only the low voltage bus.

2. The control system of claim 1 wherein the modules include battery cells in a series cell connection, the series-connected cells being equally arranged in each of the modules.

3. The control system of claim 2 including an ignition module controlling the switch and wherein the ignition module is configured to determine one of a run key position that supplies a high voltage and a low voltage power demand and an accessory key position that supplies only a low voltage power demand.

4. The control system of claim 2 including an ignition module controlling the switch and wherein the ignition module connects the high voltage output to a DC/DC converter that supplies a low voltage power demand when the ignition module is actuated to a run key position.

5. The control system of claim 4 wherein the switch is a high/low voltage switch connected to the high and low voltage output and a low voltage switch connected to the low voltage output.

6. The control system of claim 5 wherein the switch has a high/low voltage solenoid and a low voltage connector solenoid, the ignition module controlling the high/low voltage solenoid and the low voltage solenoid such that the high/low voltage switch is in electrical communication with a hybrid vehicle electrical system and the low voltage switch is disconnected from the hybrid vehicle electrical system.

7. The control system of claim 4 wherein the switch system includes a change-over switch.

8. The system of claim 7 wherein the switch is a single change-over switch solenoid, the ignition module controlling the single change-over switch solenoid such that the high/low voltage switch is in electrical communication with a hybrid vehicle electrical system and the low voltage switch is disconnected from the hybrid vehicle electrical system.

9. The control system of claim 2 including an ignition module controlling the switch and wherein the ignition module connects the high voltage output to a high voltage electrical power demand when the ignition module is actuated to a run key position.

10. The control system of claim 9 wherein the ignition module disconnects the high voltage output from the high voltage electrical power demand when the ignition module is actuated to an accessory key position.

11. A vehicle electrical control system comprising:
a battery having modules connected in series for high voltage electrical output to a high voltage harness and all being connected in parallel for electrical output to a low voltage harness;
a switch system including an ignition module selectively electrically connecting the battery through the low voltage output to a low voltage bus via a single switch.

12. The control system of claim 11 wherein the ignition module is configured to determine one of a run key position that supplies a high voltage and a low voltage power demand and an accessory key position that supplies only a low voltage power demand.

13. The control system of claim 11 wherein the ignition module connects the high voltage harness to a DC/DC converter that supplies a low voltage power demand when the ignition module is actuated to a run key position.

14. The control system of claim 13 wherein the switch system includes a high/low voltage switch connected to the high and low voltage harnesses.

15. The control system of claim 14 wherein the high/low voltage switch has a high/low voltage solenoid and the single switch has a low voltage connector solenoid, the ignition module controlling the high/low voltage solenoid and low voltage solenoid such that the high/low voltage switch is in electrical communication with a hybrid vehicle electrical system and the single switch is disconnected from the hybrid vehicle electrical system.

16. The control system of claim 13 wherein the switch system is a change-over switch.

17. The system of claim 16 wherein the switch system includes a single change-over switch solenoid, the ignition module controlling the single change-over switch solenoid such that the high/low voltage switch is in electrical communication with a hybrid vehicle electrical system and the single switch is disconnected from the hybrid vehicle electrical system.

* * * * *